US009810858B2

(12) United States Patent
Gniadek et al.

(10) Patent No.: US 9,810,858 B2
(45) Date of Patent: Nov. 7, 2017

(54) LOCKABLE CONNECTORS AND CONNECTION ASSEMBLIES

(71) Applicant: Senko Advanced Components, Inc., Marlborough, MA (US)

(72) Inventors: Jeffrey Gniadek, Northbridge, MA (US); Yuki Nishiguchi, Marlborough, MA (US); Kazu Takano, Southborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/293,836

(22) Filed: Oct. 14, 2016

(65) Prior Publication Data
US 2017/0031108 A1 Feb. 2, 2017

Related U.S. Application Data

(62) Division of application No. 14/137,922, filed on Dec. 20, 2013, now Pat. No. 9,477,049.

(51) Int. Cl.
*G02B 6/38* (2006.01)
*H01R 13/625* (2006.01)
(Continued)

(52) U.S. Cl.
CPC ......... *G02B 6/3891* (2013.01); *G02B 6/3825* (2013.01); *G02B 6/3894* (2013.01);
(Continued)

(58) Field of Classification Search
CPC .................................................. G02B 6/3891
See application file for complete search history.

(56) References Cited

U.S. PATENT DOCUMENTS 2,728,895 A * 12/1955 Quackenbusch ... F16L 37/1215
285/81
3,517,371 A 6/1970 Buckley
(Continued)

FOREIGN PATENT DOCUMENTS

EP 2395609 A2 12/2011
WO 2013015544 A2 1/2013

OTHER PUBLICATIONS

Partial European Search Report dated Jun. 22, 2017, from related European Application No. 14871678.0.
(Continued)

*Primary Examiner* — Rhonda Peace
(74) *Attorney, Agent, or Firm* — Pepper Hamilton, LLP

(57) ABSTRACT

Lockable connection assemblies including lockable connection components are described. A lockable connection assembly may include an assembly for connecting components in an electrical or communication system, such as a fiber optic communication network. The lockable connection assemblies may include a connector (for example, a plug) and an adapter configured to be connected together, for example, using a bayonet-type connection. The components of the lockable connection assemblies may include elements configured to prevent the connector from unintentionally disconnecting from the adapter. For instance, the connector may include a locking nut configured to engage and lock a coupling nut connected to the adapter from rotating and disconnecting from the adapter. In another instance, the connector may include a coupling nut having finger flanges arranged at one end thereof and configured to engage a non-rotatable connector body when connected to the adapter to prevent the unintentional movement of the coupling nut.

12 Claims, 25 Drawing Sheets

(51) Int. Cl.
  *H01R 13/639* (2006.01)
  *G02B 6/42* (2006.01)
  *H01R 13/623* (2006.01)
  *H01R 13/622* (2006.01)

(52) U.S. Cl.
  CPC ......... *G02B 6/4292* (2013.01); *H01R 13/623* (2013.01); *H01R 13/625* (2013.01); *H01R 13/639* (2013.01); *H01R 13/622* (2013.01)

(56) References Cited

U.S. PATENT DOCUMENTS

| | | | | |
|---|---|---|---|---|
| 4,820,185 | A * | 4/1989 | Moulin | G02B 6/3878 385/59 |
| 5,590,228 | A * | 12/1996 | Gibola | G02B 6/389 385/56 |
| 5,662,488 | A * | 9/1997 | Alden | H01R 13/625 439/314 |
| 5,823,702 | A * | 10/1998 | Bynum | F16L 19/005 285/82 |
| 6,053,639 | A * | 4/2000 | Chen | G02B 6/3825 385/53 |
| 6,062,739 | A | 5/2000 | Blake et al. | |
| 6,293,595 | B1 * | 9/2001 | Marc | F16L 19/005 285/86 |
| 7,008,116 | B2 * | 3/2006 | Kobayashi | G02B 6/3825 385/53 |
| 7,044,650 | B1 * | 5/2006 | Tran | G02B 6/3874 385/54 |
| 7,086,886 | B2 * | 8/2006 | Thurston | H01R 13/623 439/314 |
| 7,207,727 | B2 * | 4/2007 | Tran | G02B 6/3825 385/54 |
| 7,914,311 | B1 | 3/2011 | Gallusser et al. | |
| RE42,522 | E * | 7/2011 | Zimmel | G02B 6/3825 385/55 |
| 9,477,049 | B2 * | 10/2016 | Gniadek | G02B 6/3894 |
| 9,671,569 | B2 * | 6/2017 | Kempeneers | G02B 6/3887 |
| 2006/0089049 | A1 * | 4/2006 | Sedor | G02B 6/3879 439/620.21 |
| 2008/0050070 | A1 * | 2/2008 | Gurreri | G02B 6/3849 385/55 |
| 2009/0148101 | A1 * | 6/2009 | Lu | G02B 6/3816 385/56 |
| 2009/0191738 | A1 | 7/2009 | Kadar-Kallen et al. | |
| 2013/0028569 | A1 * | 1/2013 | Kempeneers | G02B 6/4471 385/139 |
| 2013/0072048 | A1 * | 3/2013 | Schafer | H01R 13/622 439/372 |
| 2013/0244466 | A1 | 9/2013 | Cole et al. | |
| 2015/0168656 | A1 * | 6/2015 | Kempeneers | G02B 6/4471 385/86 |
| 2015/0177467 | A1 * | 6/2015 | Gniadek | G02B 6/3894 385/58 |
| 2016/0266326 | A1 * | 9/2016 | Gniadek | H01R 24/66 |

OTHER PUBLICATIONS

International Preliminary Report on Patentability dated Jun. 30, 2016, from related International Application No. PCT/US14/69065, International Filing dated Dec. 8, 2014.

* cited by examiner

VIEW A-A

VIEW B-B

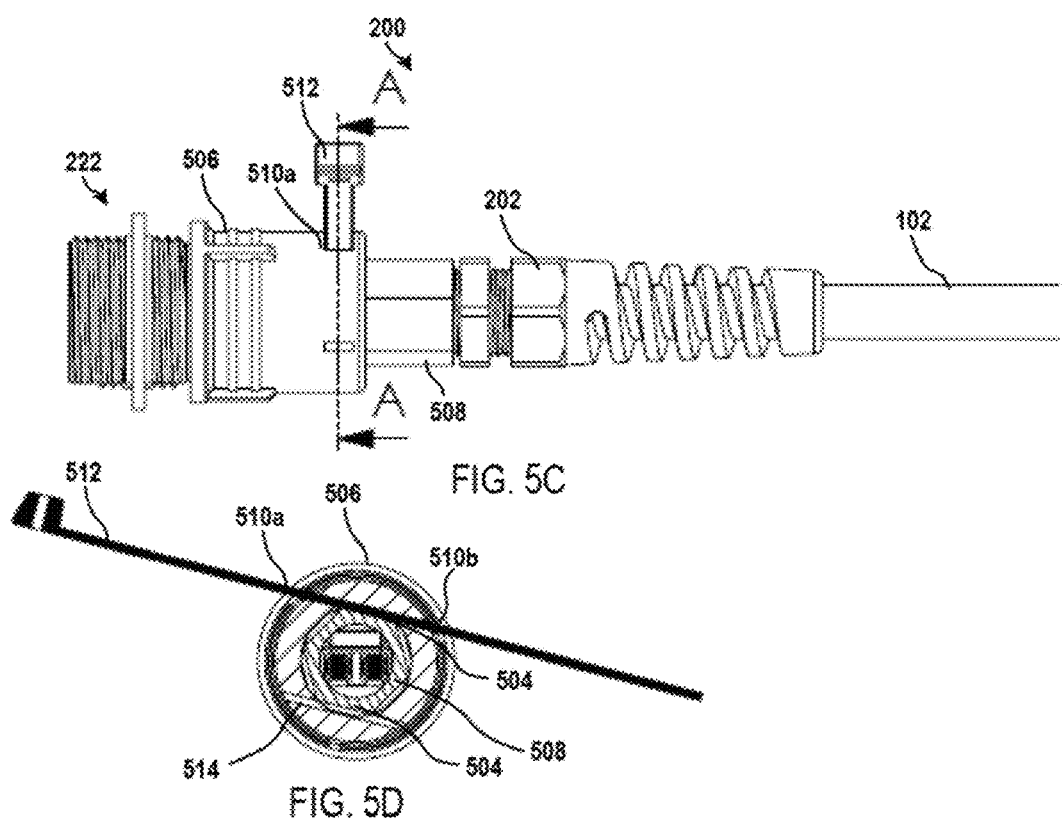

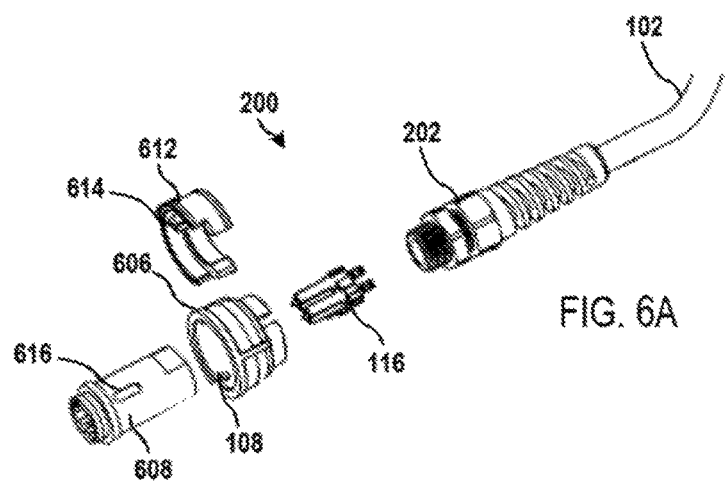
FIG. 6A
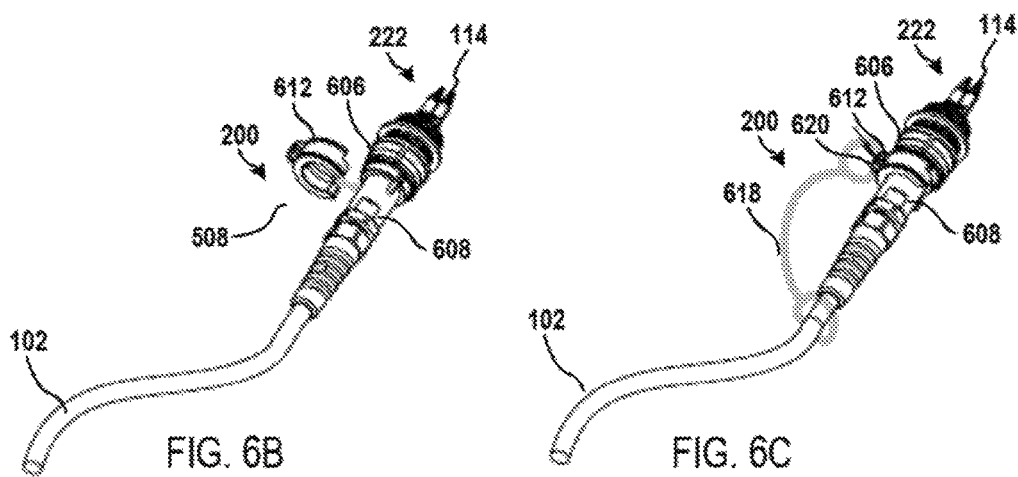
FIG. 6B
FIG. 6C

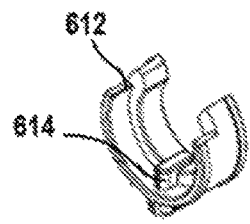
FIG. 6D
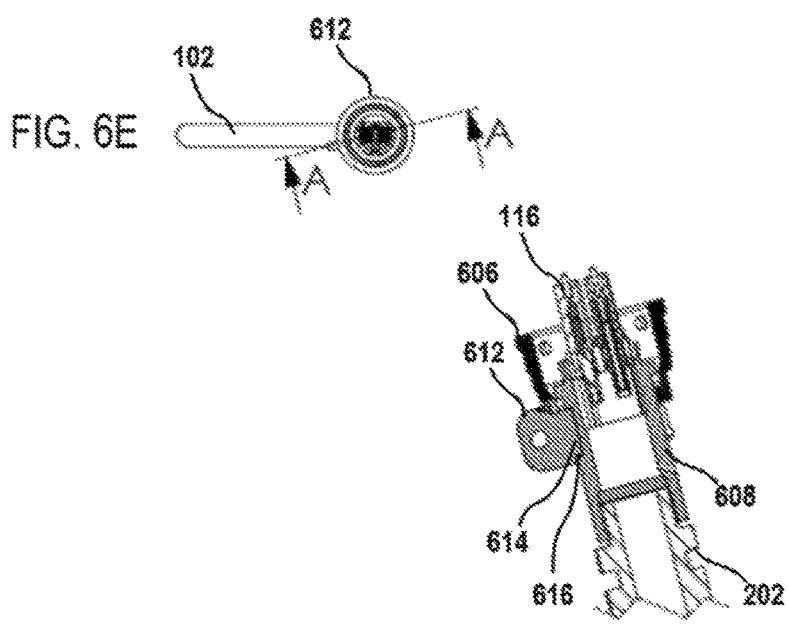
FIG. 6E
FIG. 6F

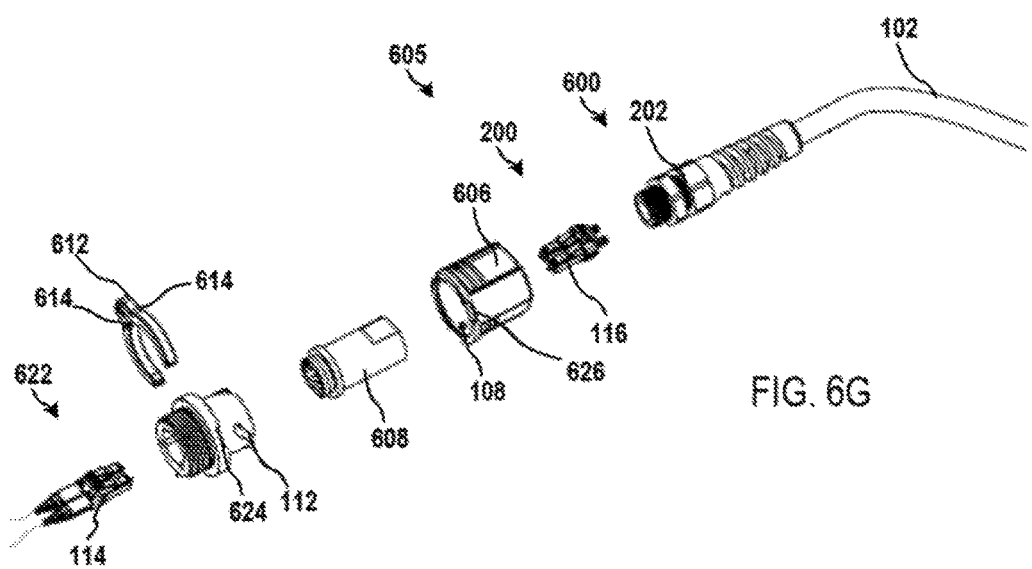
FIG. 6G
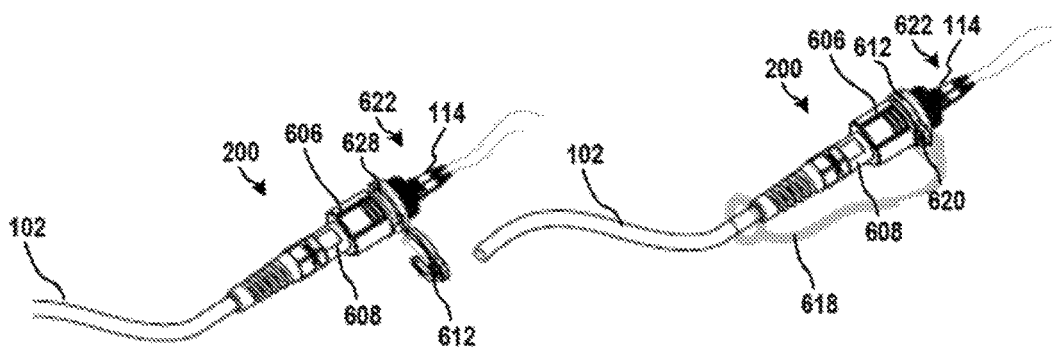
FIG. 6H
FIG. 6I

LOCKABLE CONNECTORS AND CONNECTION ASSEMBLIES

CROSS REFERENCE TO RELATED APPLICATIONS

This application is a divisional of and claims priority to U.S. patent application Ser. No. 14/137,922 filed Dec. 20, 2013.

FIELD OF THE INVENTION

The described technology generally relates to lockable connection assemblies configured to provide a secure connection between cable segments, equipment, and/or devices, and, more specifically, to complementary connectors and adapters configured to engage in a locking arrangement that prevents the unintended removal of a connector from an adapter.

BACKGROUND

The efficiency and reliability of telecommunication networks is dependent on various factors, such as the quality of connections between cable segments, network equipment, devices, and other cable segments. Telecommunication equipment is increasingly being used in harsh environments, including factories, motor vehicles, industrial equipment, military equipment, and on cellular antennae towers. In such environments, conventional connection assemblies often become unintentionally disconnected due to vibration, impact, temperature changes, and exposure to other harsh conditions. In addition, the connection between components may be negatively affected by the ingress of dust, dirt, moisture, and/or other contaminants. Fiber optic network segments are particularly vulnerable because fiber optic connections require extremely precise termination and alignment between connected components and cable segments. Accordingly, telecommunication network providers would benefit from a connection assembly capable of maintaining a secure connection and preventing the ingress of unwanted contaminants in harsh environments.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one aspect, a lockable connection component may comprise a coupling nut configured to rotatably couple the lockable connection component to a complementary mating component at a connection interface, the coupling nut having at least one locking collar interface; a connector body arranged within a longitudinal bore of the coupling nut and configured to be non-rotatably attached to the lockable connection component; and a locking collar having at least one coupling nut interface, the locking collar being configured to non-rotatably slide over the connector body and interface with the coupling nut such that the at least one coupling nut interface engages the at least one locking collar interface, thereby preventing the coupling nut from rotating and disconnecting from the complementary mating component.

In one aspect, a lockable connection component may comprise a coupling nut configured to rotatably couple the lockable connection component to a complementary mating component, the coupling nut having at least one connector body interface element; and a connector body configured to be non-rotatably attached to the lockable connection component and arranged within a longitudinal bore of the coupling nut, the connector body having at least one coupling nut interface configured to be fixedly engaged by the at least one connector body interface element, thereby preventing the coupling nut from rotating and disconnecting from the complementary mating component.

In one aspect, a lockable connection component may comprise a coupling nut configured to rotatably couple the lockable connection component with a complementary mating component, the coupling nut having at least one slot; a connector body configured to be non-rotatably attached to the lockable connection component and having at least one external recess, the connector body being arranged within a longitudinal bore of the coupling nut such that the at least one slot corresponds with the at least one external recess; and a clip component having at least one protrusion, the clip component being configured to engage the coupling nut such that the at least one protrusion extends through the at least one slot and engages the at least one external recess, thereby preventing the coupling nut from rotating and disconnecting from the complementary mating component.

In one aspect, a lockable connection assembly may comprise a first connection component having a coupling nut configured to rotatably couple the first connection component with a second connection component, the coupling nut having at least one first slot and the second connection component having at least one second slot, wherein a gap exists between the coupled first connection component and second connection component; a clip component having at least one first protrusion and at least one second protrusion, the clip component being configured to be inserted within the gap such that the at least one first protrusion engages the at least one first slot and the at least one second protrusion engages the at least one second slot, thereby preventing the coupling nut from rotating and disconnecting from the second connection component.

BRIEF DESCRIPTION OF THE DRAWINGS

The above and other objects of the present invention will become more readily apparent from the following detailed description taken in connection with the accompanying drawings.

FIGS. 2I-K depict various views of a lockable connector element according to a second locking collar embodiment.

FIGS. 5A-D depict an illustrative lockable connector element according to some pin lock embodiments.

FIGS. 6A-I depict an illustrative lockable connector according to some C-clip embodiments.

DETAILED DESCRIPTION

Figure 1A:
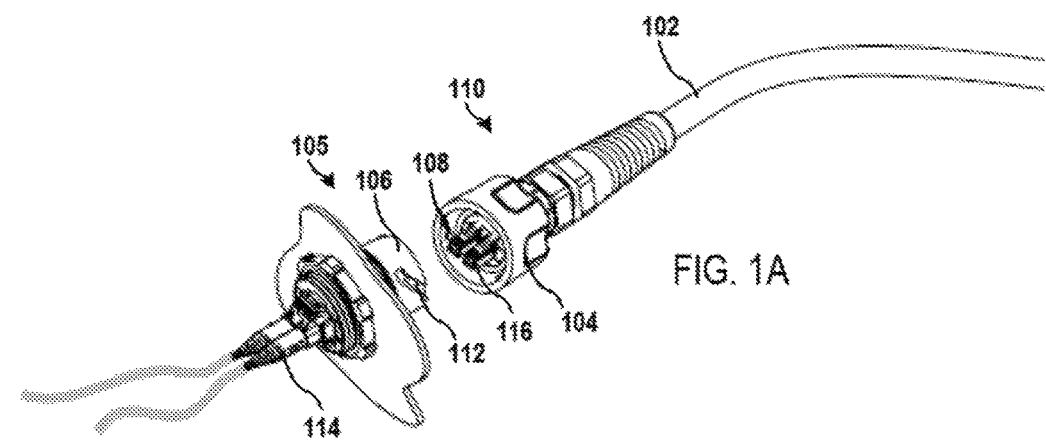
FIGS. 1A-F depict various views of an illustrative fiber optic connection assembly.

The described technology generally relates to lockable connection assemblies for providing secure connections between cable segments and/or devices within a network. The network may include any type of network capable of transmitting signals, electricity, or any other type of transmission medium. For example, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the lockable connection assemblies may be configured to connect cable segments and/or devices within a fiber optic network using various standard connector types, including, but not limited to LC, ST, SC, FC, DIN, D4, SMA, E2000, Biconic, FullAXS, OCD, and/or MPO. In some embodiments, the lockable connection assemblies may be configured to meet various standards, such as the British Standards Institution (BSI), the Open DeviceNet Vendors Association (ODVA), and/or the like. In some embodiments, the lockable connection assemblies may be used with copper-type network connections, such as RJ-45 type connectors.

According to some embodiments, the lockable connection assemblies may be configured to lock a connection assembly connector (for instance, a plug, male connector, connector, or "lockable connector") to a connection assembly adapter (for instance, a receptacle, female connector, adapter, or "lockable adapter") (collectively, the "connection components" or "complementary mating components"), or vice versa. The lockable connection assemblies may be configured to lock the connection components to each other to prevent the disconnection and/or unintentional disconnection thereof. In some embodiments, the lockable connection assemblies may be configured to provide a lock mechanism for connection components engaged to each other through conventional connection configurations. For example, a lockable connection assembly may be configured to lock connection elements engaged using a bayonet-type connection configuration, clips, tabs, plugs, or any other type of mechanical connection now known or developed in the future. In general, a lockable connection assembly may include any type of connection that requires intentional removal (for example, removal due to intentional human forces and not forces such as vibration, impact, or the like) in order to disconnect the connection components.

According to some embodiments, the lockable connectors may be configured to be coupled with the lockable adapters through a type of motion, such as rotation, axial motion, or some combination thereof. For example, a lockable connector may be coupled to a lockable adapter through an axial motion that forces a plug of the lockable connector to mate with a receptacle of the lockable adapter. In another example, a lockable connector may be coupled to a lockable adapter by rotating a shell, collar, coupling nut, or the like having bayonet locking buttons such that the bayonet locking buttons enter and slide along corresponding bayonet grooves of the lockable adapter. The lockable elements configured according to some embodiments may generally be configured to prevent the motion and/or reverse motion required to couple the lockable connector to the lockable adapter. For instance, in a bayonet-style connection assembly, lockable elements may be associated with the lockable connector and/or the lockable adapter to prevent rotation of the lockable connector and/or the lockable adapter to inhibit the unintentional disconnection of the lockable connector and the lockable adapter.

The described technology provides multiple technological advantages. A non-limiting example of an advantage is that the connection between connection components may be maintained in harsh environments in which the lockable connection assembly may be subjected to forces due to such as vibrations, impact, temperature change, moisture, wind, or the like. Another non-limiting example of an advantage is that the lockable connection assembly may be configured to prevent the ingress of unwanted contaminants into the interior of the lockable connection assembly that may interfere with the connection between the connector and the adaptor. A further non-limiting example of an advantage is that the lockable connection assembly may be assembled using relatively low-cost components and locked with minimal labor, thereby providing a cost- and resource-efficient method of providing highly secure connections within a network.

Figure 1B:
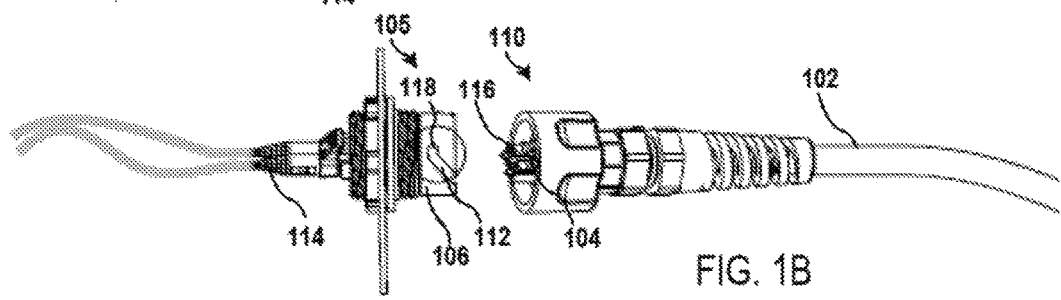
Figure 1C:
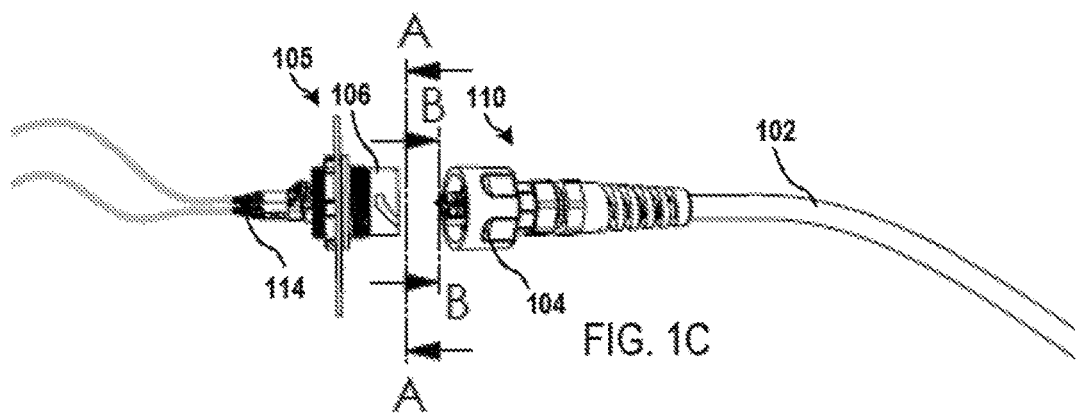

FIGS. 1A-1C depict side views of an illustrative fiber optic connection assembly. As shown in FIG. 1A, a communication cable 102 may be terminated by connector 110 configured to connect to an adapter 105. The connector 110 may include duplex LC plug connectors 116 configured to be inserted into corresponding receptacles (not shown) in the adapter 105 to form a continuous fiber optic connection with the optical connectors 114. The fiber optic connection assembly may be configured to connect using a bayonet-type connection. As such, the adapter component 106 of the adapter 105 may include bayonet grooves 112 configured to receive bayonet lock buttons 108 arranged on the connector component 104 of the connector 110. The adaptor 105 may be joined with the connector 110 using conventional bayonet connection methods. For example, the rotatable connector component 104 may be brought together with the adapter component 106, which may be non-rotatable, and rotated such that the bayonet lock buttons 108 enter the bayonet grooves 112. As the connector component 104 is rotated, the bayonet lock buttons 108 may ride along the bayonet grooves 112, axially drawing the connector 110 toward the adapter 105 until the bayonet lock buttons 108 reach their respective button seats or bumps 118 in the bayonet grooves 112. The bumps 118 may have various dimensions according to various standards, such as BIS standards, to accommodate the bayonet lock buttons 108 and to facilitate the bayonet-type connection between the connector 110 and the adapter 105. For example, the bumps 118 may have a height of about 0.2 millimeters to about 0.3 millimeters.

Figure 1D:
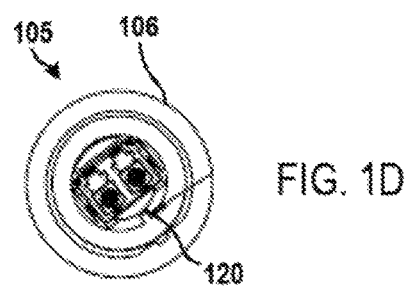
Figure 1E:
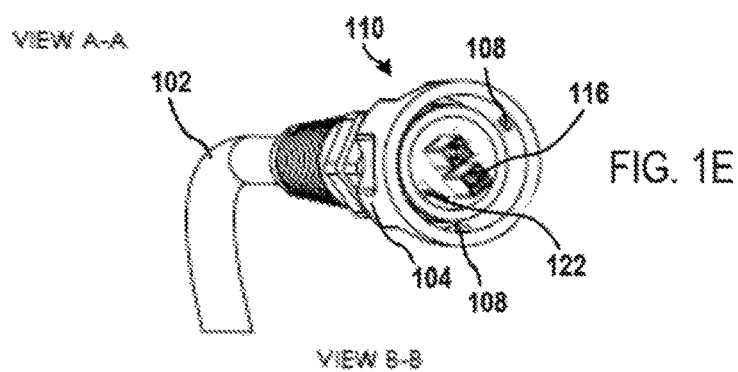
Figure 1F:
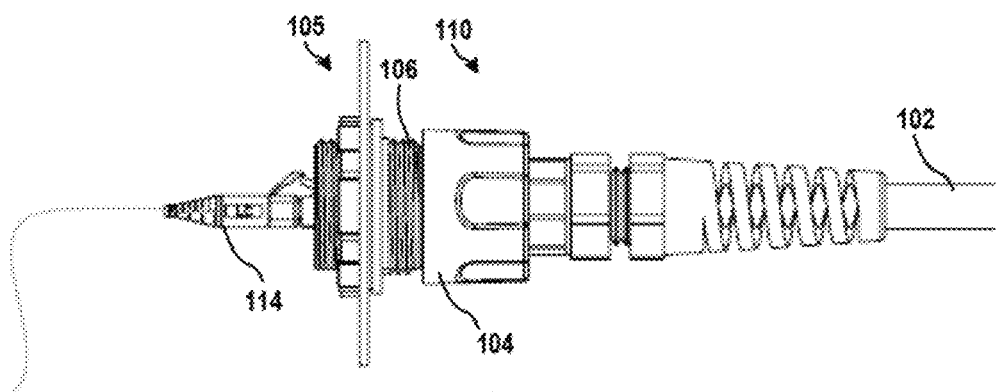

Conventional connection assemblies may include rudimentary elements configured to prevent rotation of the connector component 104 after the bayonet-type connection has been achieved (for example, once the bayonet lock buttons 108 have been seated in the bumps 118). FIGS. 1D and 1E depict an ODVA key mechanism configured to prevent rotation of the connector component 104 after being connected to the adapter component 106 through the bayonet connection. FIG. 1D depicts a front view of the adapter 105 through line A-A of FIG. 1C. As shown in FIG. 1D, an internal surface of the adapter component 106 may include an adapter key 120 configured to engage a key slot 122 of the connector component 104 as depicted in FIG. 1E (showing the connector 110 through the line B-B of FIG. 1C). When the connector 110 is coupled to the adapter 105, the adapter key 120 may fit into the key slot 122 to prevent rotation of the connector component 104 and release of the bayonet-type connection. FIG. 1F depicts the connector 110 coupled to the adapter 105 using the bayonet-type connection and the ODVA key mechanism.

Figure 2A:
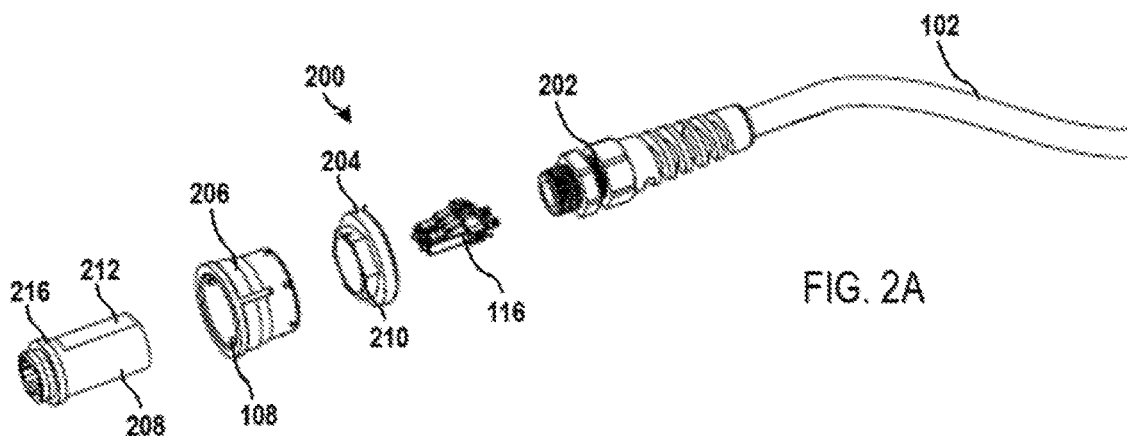
FIGS. 2A-H depict various views of a lockable connector element according to a first locking collar embodiment.
Figure 2B:
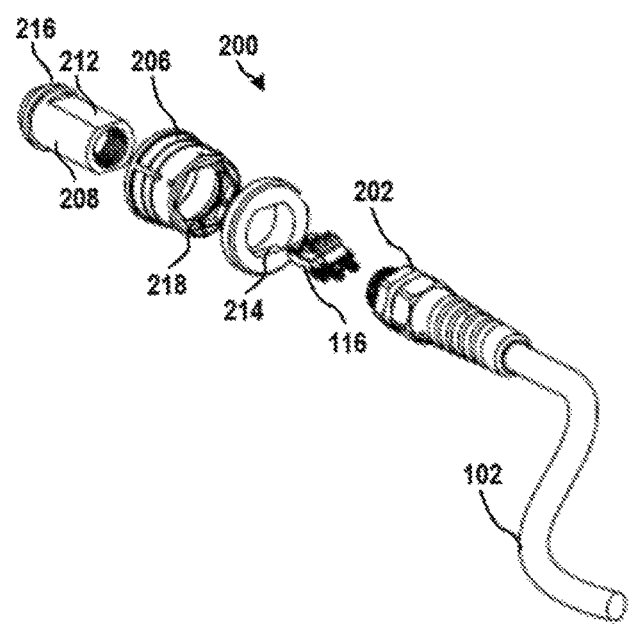

FIGS. 2A and 2B depict a lockable connector element according to a first locking collar embodiment. As shown in FIGS. 2A and 2B, the lockable connector 200 may be a connector configured to connect plug 116 to a receptacle of an adapter (not shown). Although a connector (plug or male connector) is depicted FIGS. 2A and 2B, and is used in some other embodiments herein, lockable connector elements are not so limited, as adapters may also be configured as lockable connector elements. The lockable connector 200 and portions thereof may be made from various resilient materials, such as plastics, polymers, rubber, silicon-based materials, metals, metal alloys, and any combination thereof.

The lockable connector 200 may include a connector body 208 configured to be threaded onto a compression fitting 202 of an optical fiber cable 102. The connector body 208 may be arranged within a longitudinal bore of a coupling nut 206 that may rotate about the connector body. In some embodiments, once the connector body 208 has been threaded onto the compression fitting 202, the connector body may be immobile or substantially immobile (for instance, will not rotate or will not rotate in one direction only). A flange 216 may be arranged at a proximal end of the connector body 208 (proximal with respect to the connection between the connector 200 and the adapter) that is configured to engage the inside of the coupling nut 206 to prevent the coupling nut from sliding off of the proximal end of the connector body. The coupling nut 206 may include one or more bayonet locking buttons 108 configured to engage complementary bayonet grooves of an adapter to couple the lockable connector 200 thereto.

The lockable connector 200 may include a locking collar 204 configured to engage the coupling nut 206 and to prevent the rotation of the coupling nut when the lockable connector is attached to the adapter through the bayonet-type connection. The connector body 208 may include a locking collar interface 212 (the "connector body locking collar interface") configured to engage with a corresponding connector body interface 214 of the locking collar 204 to prevent rotation of the locking collar about the connector body. As such, the locking collar 204 may slide over the connector body 208, but may not rotate over the connector body. In some embodiments, the locking collar interface 212 and the connector body interface 214 may be formed as corresponding flat surfaces.

Figure 2C:
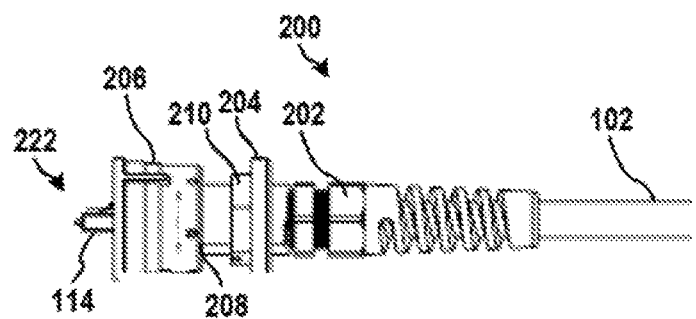
Figures 2D, 2E, 2F:
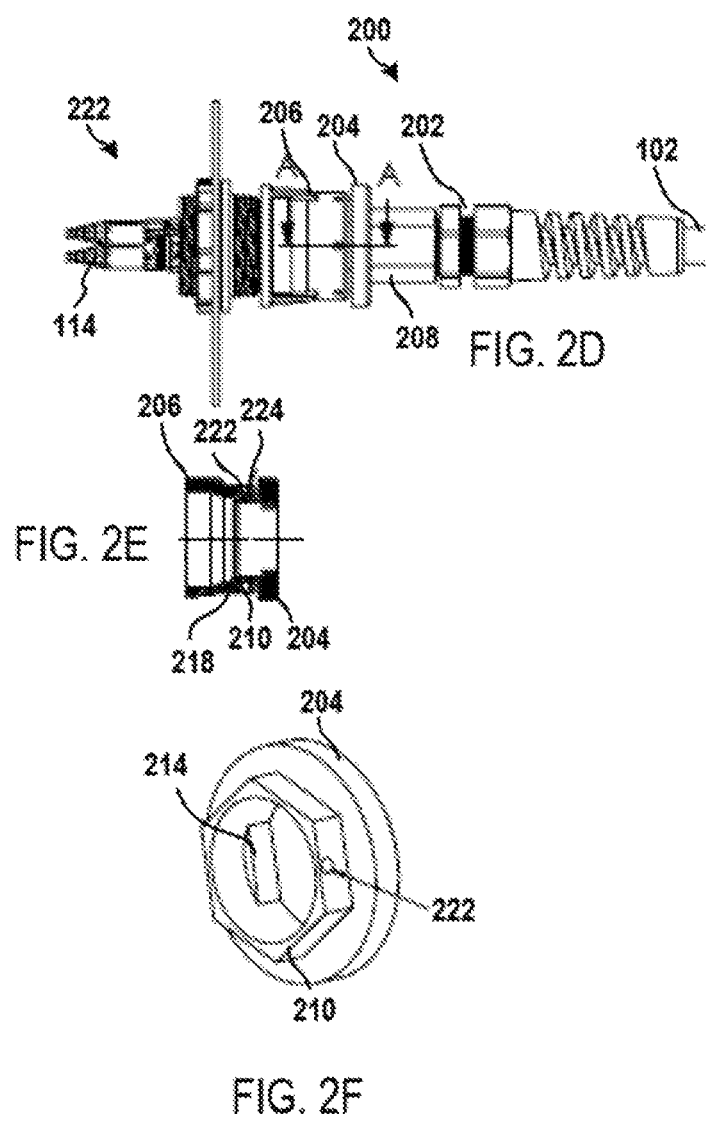

The coupling nut 206 may include a locking collar interface 218 (the "coupling nut locking collar interface") configured to engage with a coupling nut interface 210 of the locking collar and prevent rotation of the coupling nut 206. In some embodiments, the coupling nut interface 210 and the locking collar interface 218 may be formed as corresponding flat surfaces. When the coupling nut 206 has formed a bayonet-type connection with the adapter, the locking collar 204 may slide over the connector body 208 and engage the coupling nut 206 such that the coupling nut interface 210 enters into the interior of the coupling nut and engages with the locking collar interface 218, thereby preventing the coupling nut 206 from rotating and disconnecting from the adapter. FIG. 2C depicts a side view of the assembled, unlocked locking connector 200 and FIG. 2D depicts a side view of the assembled locking connector 200 locked and connected to an adapter 220.

Although the locking collar interface 212, the connector body interface 214, coupling nut interface 210, the locking collar interface 218, and other similar interfaces described herein are depicted as being flat surfaces, embodiments are not so limited, as the interfaces may include any configuration capable of allowing one element to engage (for example, prevent rotation or other movement of) another element, including protrusions, raised elements, tabs, slots, flanges, fasteners, pins, or the like.

In some embodiments, the locking collar 204, the connector body 208, and/or the coupling nut 206 may include one or more elements configured to prevent the locking collar from sliding out of engagement with the coupling nut. In some embodiments, the locking collar 204, the connector body 208, and/or the coupling nut 206 may include at least one raised feature configured to be seated within a corresponding recess in another of the locking collar, the connector body, and/or the coupling nut to prevent movement of the locking collar once the locking connector 200 is locked. FIG. 2E depicts an illustrative locking collar configured to prevent movement of the locking collar through line A-A of FIG. 2D. As shown in FIG. 2E, the surface of the coupling nut interface 210 of the locking collar 204 may include at least one raised element 222 corresponding to at least one recess 224 arranged in the locking collar interface 118 of the coupling nut 206.

According to some embodiments, the locking collar 204 may be pushed into the interior of the coupling nut 206, engaging the at least one raised element 222 with the external surface of the locking collar interface 218 and forcing the locking collar interface to move away from the coupling nut interface 210 until the at least one raised element is seated in the at least one recess 224. Seating (or "snapping") the at least one raised element 222 into the at least one recess 224 may operate to prevent the locking collar 204 from moving away from the coupling nut 206. FIG. 2F depicts an illustrative locking collar 204 showing a raised element 222 and the connector body interface 214.

Figure 2G:
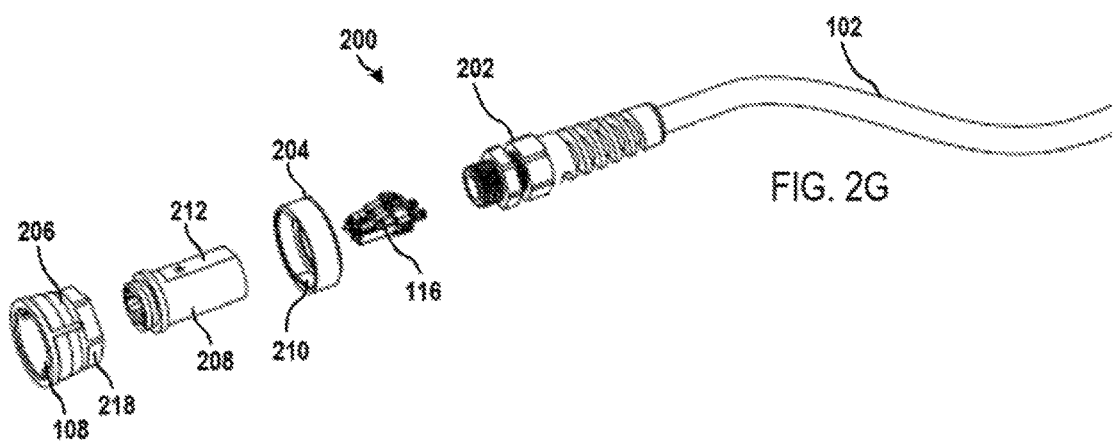
Figure 2H:
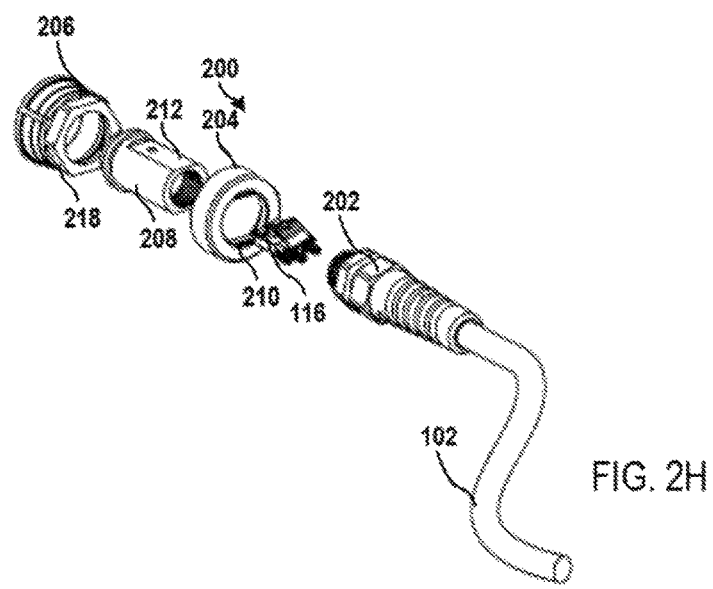
Figure 21:
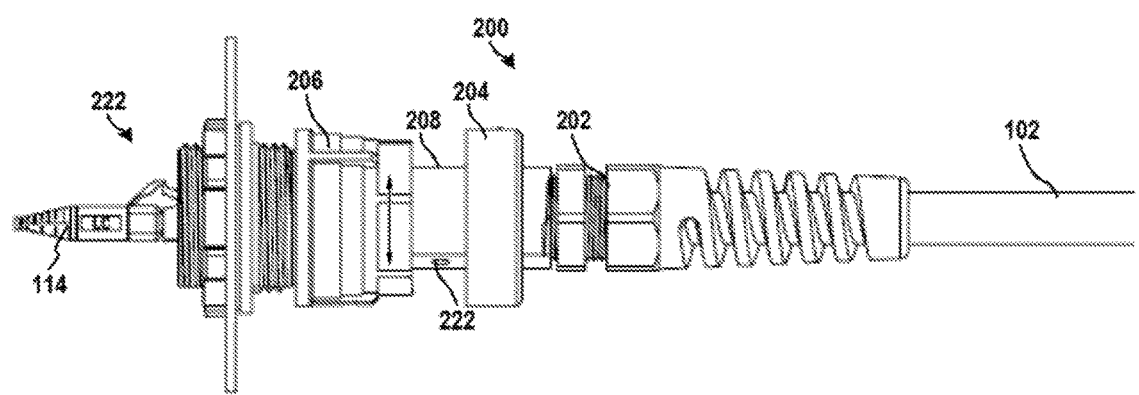
Figure 2J:
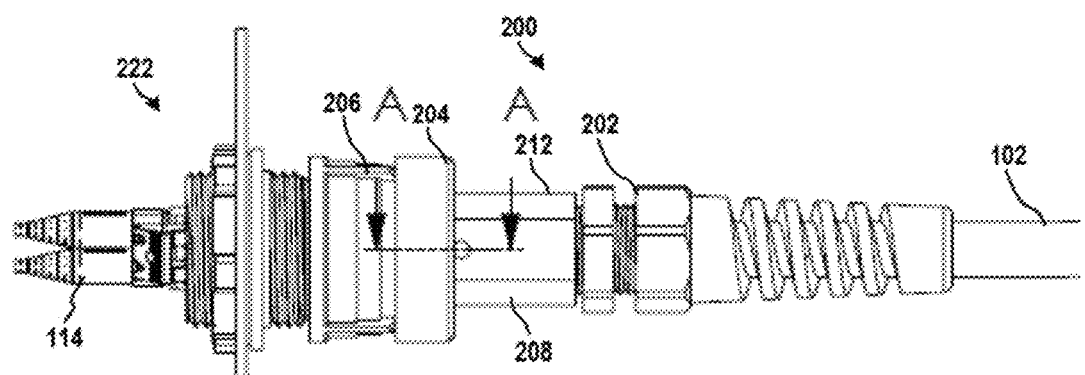

FIGS. 2G and 2H depict a lockable connector element according to a second locking collar embodiment. As shown in FIGS. 2G and 2H, the locking collar interface 218 of the coupling nut 206 may be located on an external surface of the coupling nut, for instance, at a distal end thereof. The locking collar 204 may be include an internal coupling nut interface 210 configured to engage the locking collar interface 218 of the coupling nut 206. In this manner, the coupling nut interface 210 may non-rotatably slide over the connector body 208 and engage the locking collar interface 218 and prevent rotation of the coupling nut 206 and, therefore, disconnection of the lockable connector 200 from the adapter. FIG. 2I depicts the assembled lockable connector 200 coupled to the adapter 220 and unlocked. FIG. 2J depicts the assembled connector 200 coupled to the adapter 220 in which the locking collar 204 has moved over the connector body 208 and engaged the coupling nut 206 to lock the lockable connector 200.

Figure 2K:
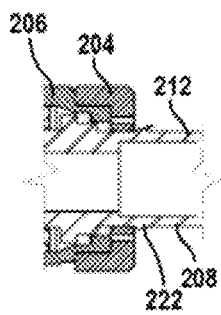

As shown in FIG. 2I, the connector body 208 may include at least one raised element 222. FIG. 2K depicts the portion of the lockable connector 200 through line A-A of FIG. 2I. The locking collar 204 may be configured to move over the raised element 222 when engaging the coupling nut 206 when the coupling nut has formed a bayonet-type connection with the adapter 220. Once the locking collar 204 moves past the raised element 222, the locking collar is prevented from moving proximally away from the coupling nut 206 and unlocking the locked connector body 208.

In this manner, the coupling nut interface 210 may slide over and engage the locking collar interface 218 and prevent rotation of the coupling nut 206 and, therefore, disconnection of the lockable connector 200 from the adapter. FIG. 2I depicts the assembled lockable connector 200 coupled to the adapter 220 and unlocked. FIG. 2J depicts the assembled connector 200 coupled to the adapter 220 in which the locking collar 204 has moved over the connector body 208 and engaged the coupling nut 206 to lock the lockable connector 200.

Figure 2L:
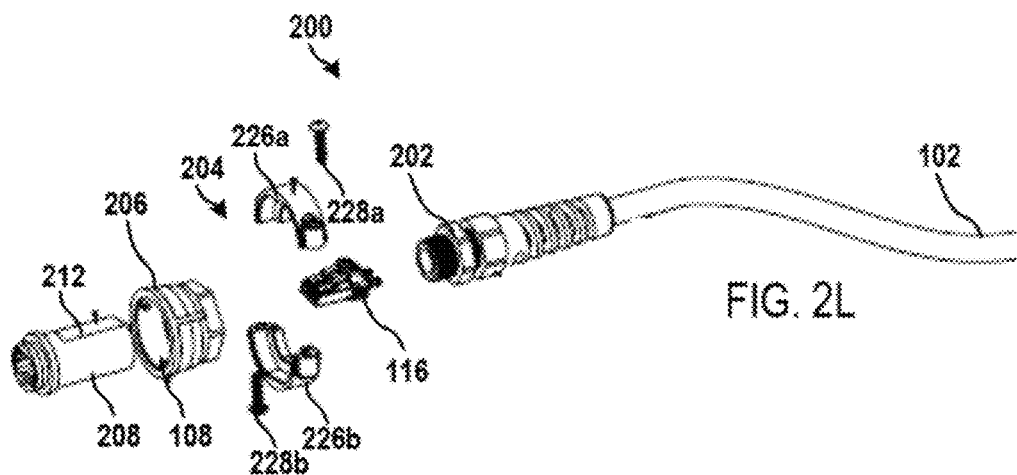
FIGS. 2L-N depict various views of a lockable connector element according to a third locking collar embodiment.
Figure 2M:
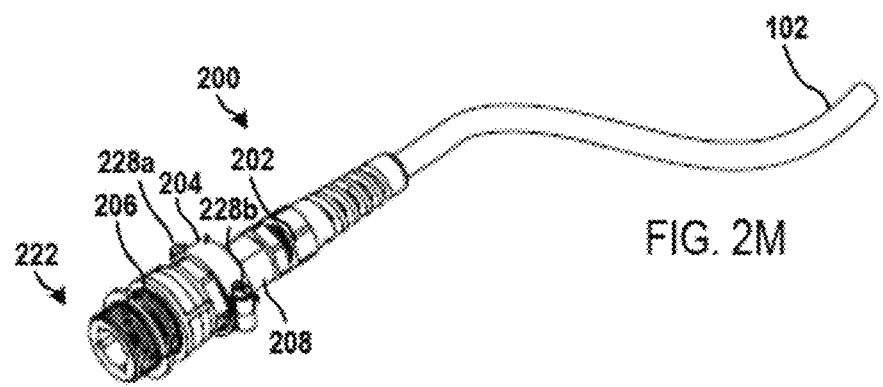

FIGS. 2L and 2M depict a lockable connector element according to a third locking collar embodiment. As shown in FIGS. 2L and 2M, the locking collar 204 may be configured as a split-lock collar including two collar portions 226a, 226b that may be fastened together using one or more fasteners 228a, 228b, such as screws (for instance, set screws, wing-nut type screws, or the like). When fastened, the split-lock collar 204 may form a coupling nut interface 210 configured to engage a locking collar interface 218 located on an external surface of the coupling nut 206, for instance, at a distal end thereof. When fastened, the split-lock collar 204 may also form a connector body interface 214 configured to engage a locking collar interface 212 located on an external surface of the connector body 208.

Figure 2N:
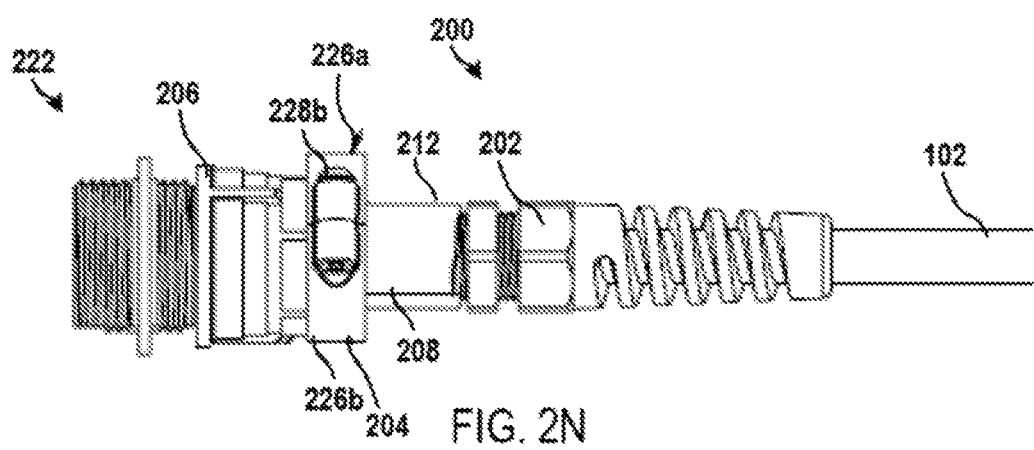

The locking collar 204, when fastened, may be configured to non-rotatably slide over the connector body 208 and engage the coupling nut 206 or may be fastened directly in engagement with the coupling nut. The locking collar interface 212 may engage the connector body interface 214 and prevent the fastened locking collar 204 from rotating about the connector body 208. The coupling nut interface 210 may engage the locking collar interface 218 and prevent the coupling nut 206 from rotating and disconnecting the lockable connector 200 from the adapter 220. FIG. 2N depicts the lockable connector 200 connected to the adapter 220 and locked to prevent rotation of the coupling nut 206.

Figure 3A:
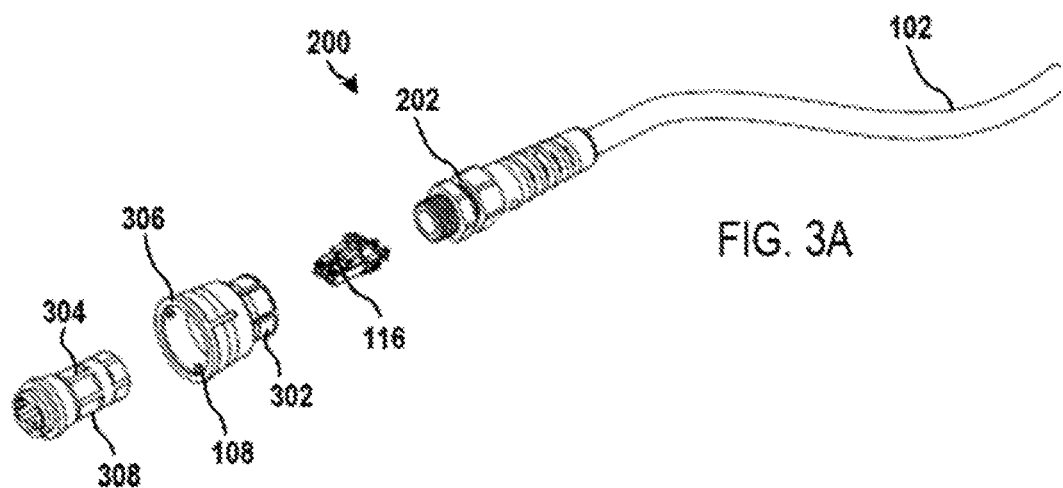
FIGS. 3A-E depict a lockable connector element according to a flexible finger embodiment.
Figure 3B:
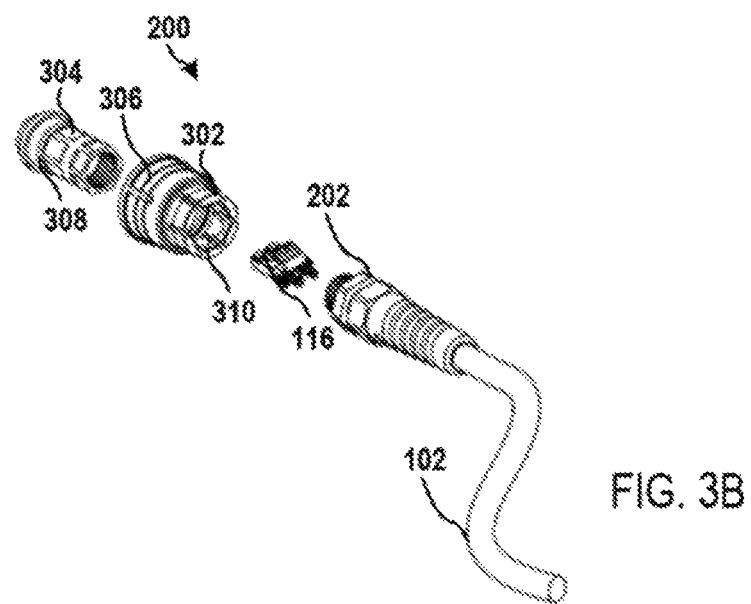

FIGS. 3A and 3B depict a lockable connector element according to a flexible finger embodiment. As shown in FIGS. 3A and 3B, the lockable connector 200 may include a coupling nut 306 having one or more flexible fingers 302 arranged at a proximal end thereof. In some embodiments, the one or more flexible fingers 302 may be biased to press inward toward the central axis of the coupling nut 306. In some embodiments, the flexible fingers 302 may be collet fingers. In some embodiments, the flexible fingers 302 may each include a flange 310 extending inward toward the central axis of the coupling nut 306. A connector body 308 may be configured to be arranged within a longitudinal bore of the coupling nut 306. The connector body 308 may have one or more recesses 304 configured to correspond with the one or more flexible fingers.

Figure 3C:
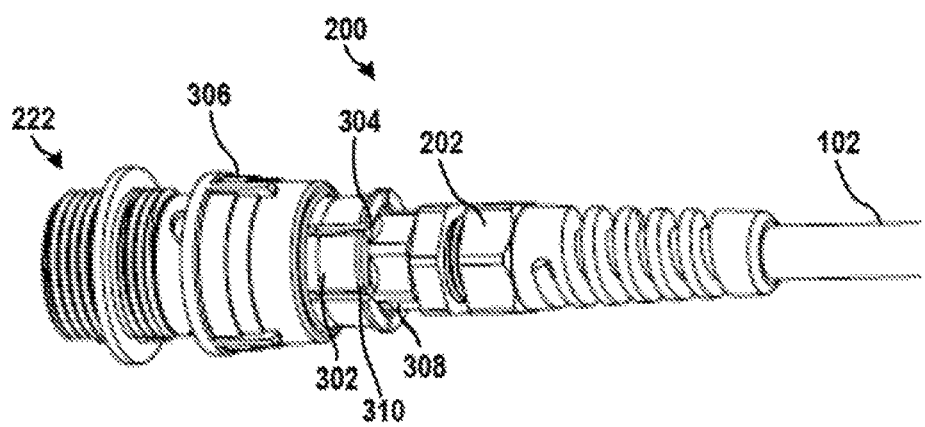
Figure 3D:
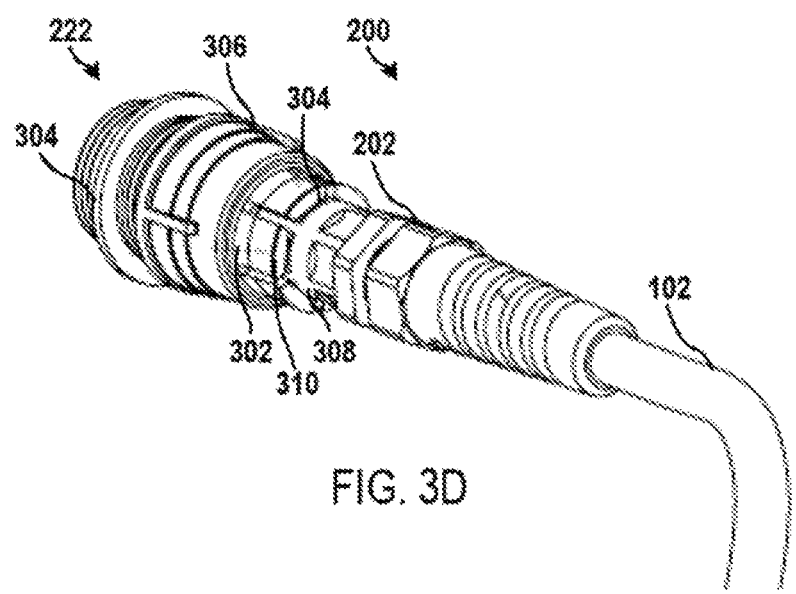

In FIG. 3C, the coupling nut 306 is being rotated about the connector body 308 as the bayonet locking buttons (not shown) are sliding within the bayonet groove (not shown) of the adapter 220. Before the bayonet-type connection is formed, the flexible fingers 304 may bend or flex outward (for instance, away from the connector body 308), allowing the coupling nut 306 to rotate on the connector body 308. Referring to FIG. 3D, the coupling nut 306 has formed the bayonet-type connection with the adapter 220. As such, the coupling nut 306 has moved proximally along the connector body 308 such that the one or more flexible fingers 302 have been seated in the one or more recesses 304. In this arrangement, the one or more flexible fingers 302 are pressing inward against the inner surfaces of the one or more recesses, thereby preventing rotation of the coupling nut 306 and disconnection of the lockable connector 200 with the adapter 220.

Figure 3E:
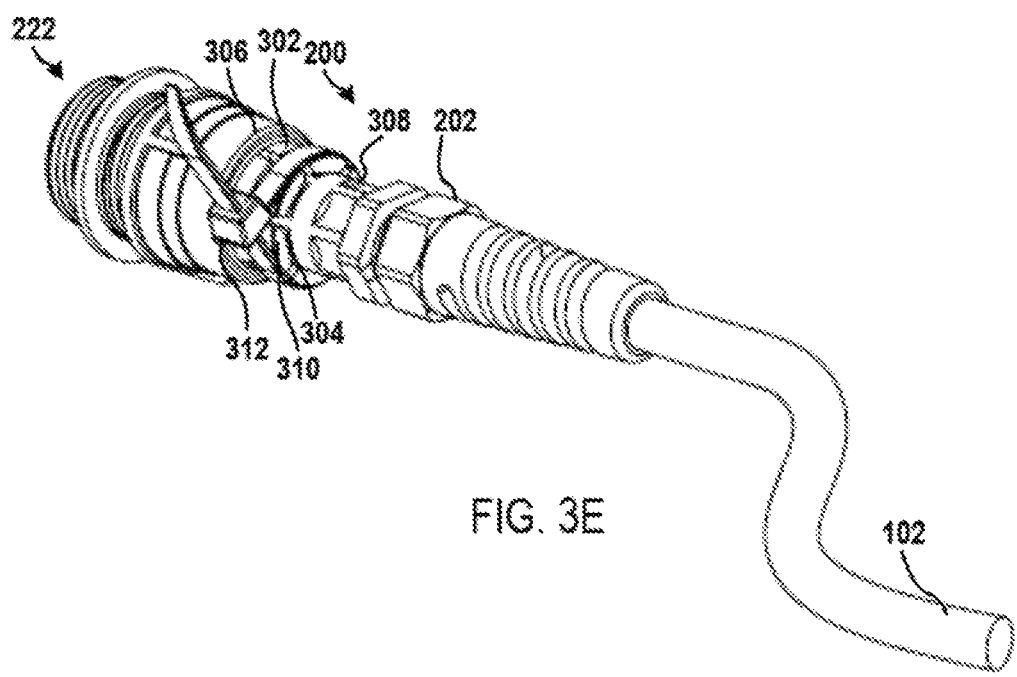

According to some embodiments, various additional locking elements may be configured to enhance the security of the lock formed between the coupling nut 306 and the connector body 308. For example, a band may be arranged around the outer surfaces of the one or more flexible fingers 304 to provide inward pressure (for instance, pressure toward the center of the coupling nut 306) to prevent the one or more flexible fingers from being moved outward (for instance, away from the connector body 308). FIG. 3E depicts a standard electrical cable tie 312 being affixed to the lockable connector 200 around the one or more flexible fingers 304. The cable tie 312 may prevent the one or more flexible fingers 304 from moving outward and weakening the lock formed between the coupling nut 306 and the connector body 308.

Figure 4A:
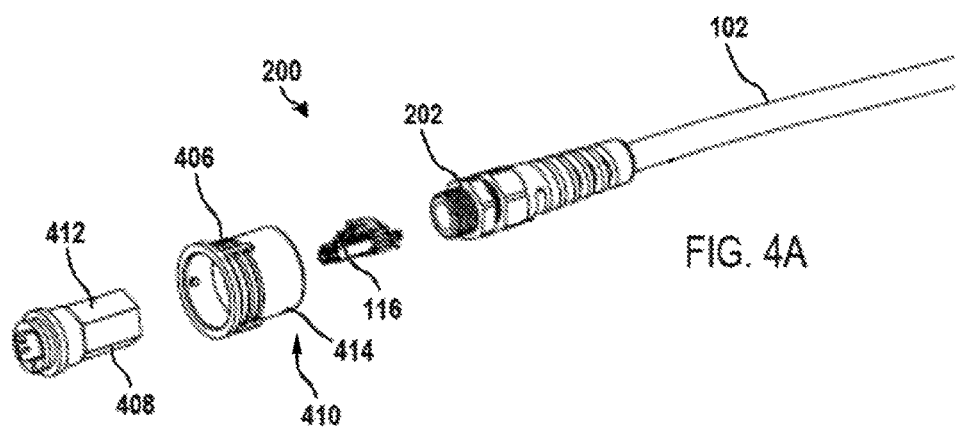
FIGS. 4A-C depict an illustrative lockable connector element according to a screw lock embodiment.
Figure 4B:
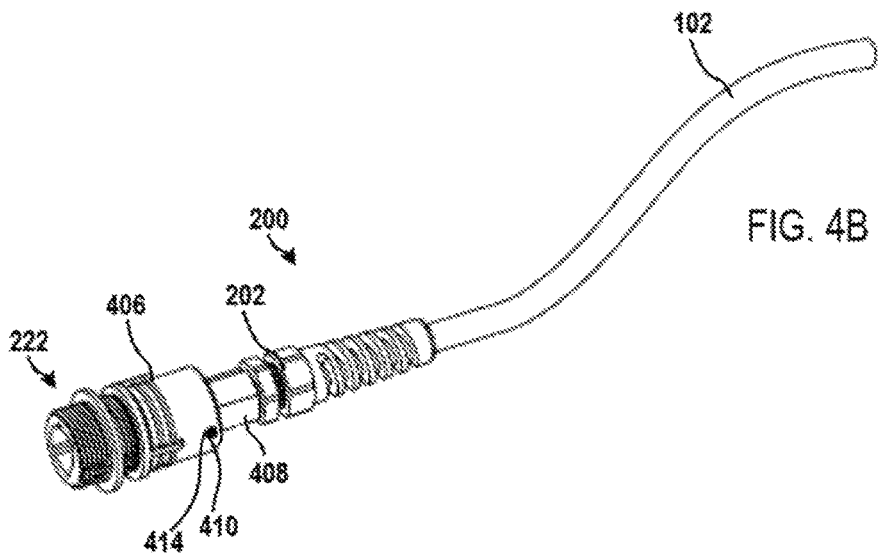

FIGS. 4A and 4B depict an illustrative lockable connector element according to a screw lock embodiment. A coupling nut 406 may be configured to couple the locking connector 200 with an adapter using a bayonet-type connection. The coupling nut 406 may be associated with a locking element 410 configured to engage a locking element interface 412 of the connector body 408. The locking element 410 may include a screw or other similar fastener configured to engage the coupling nut 406 through a corresponding opening 414. For instance, the opening 414 may include a threaded opening configured to receive a screw-type locking element 410.

Figure 4C:
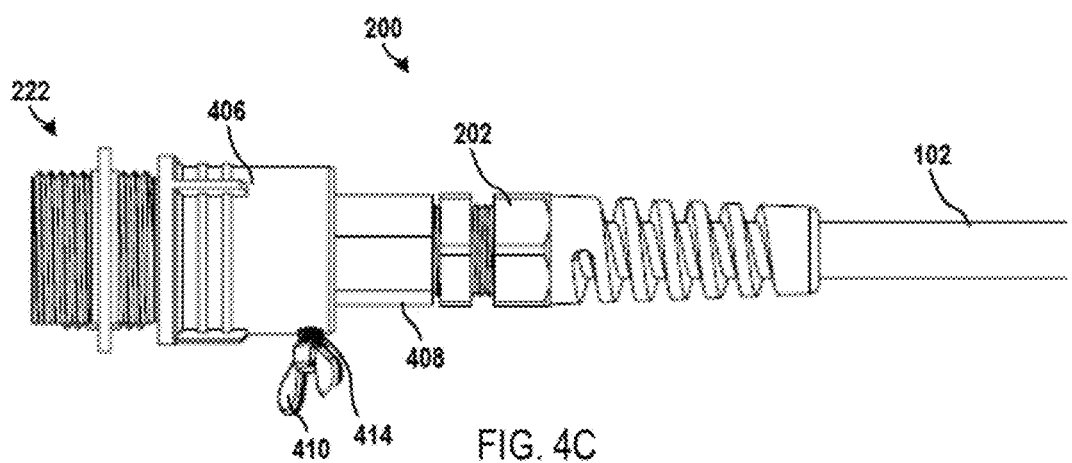

FIG. 4B depicts the lockable connector 200 coupled to an adapter 220. When the bayonet-type connection between the lockable connector 200 and the adapter 220 has been formed, the screw-type locking element 410 may be rotated into the corresponding threaded opening 414, passing through the coupling nut 406 and engaging the locking element interface 412 of the connector body 408. The screw-type locking element 410 may press against the locking element interface 412 while a portion of the screw-type interface element remains within the threaded opening 414 engaging the coupling nut 406, thereby locking the lockable connector 200 by inhibiting rotation of the coupling nut and preventing disconnection of the lockable connector 200 from the adapter 220. FIG. 4C depicts an embodiment in which the screw-type locking element 410 is formed as a wing nut fastener that may be finger-tightened such that tools are not necessary to lock and/or unlock the lockable connector 200. In some embodiments, the lockable connector 200 may be unlocked from the adapter 220 by removing the connector body locking element 410 (for instance, sufficiently unscrewing or removing the screw-type locking element from the opening).

Figure 5A:
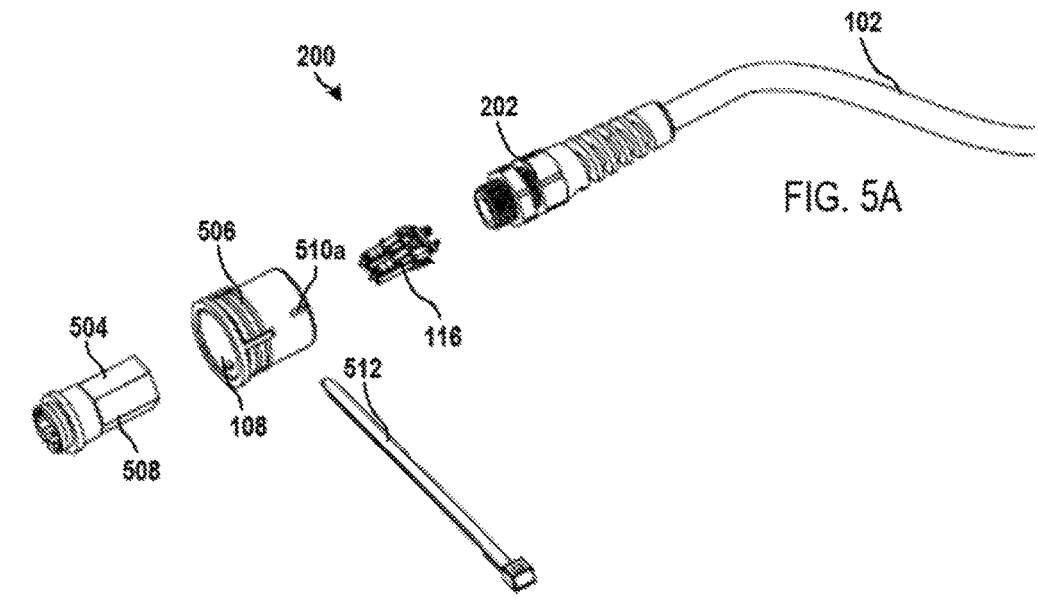

FIG. 5A depicts an illustrative lockable connector element according to a pin lock embodiment. As shown in FIG. 5A, a locking element 512 may be configured to be inserted through one or more openings 510a, 510b (opening 510b shown in FIG. 5D) in the coupling nut 506. The locking element 512 may include a key, pin, or other element capable of being inserted through openings 510a, 510b and engage a locking element interface 504 of the connector body 508.

Figure 5B:
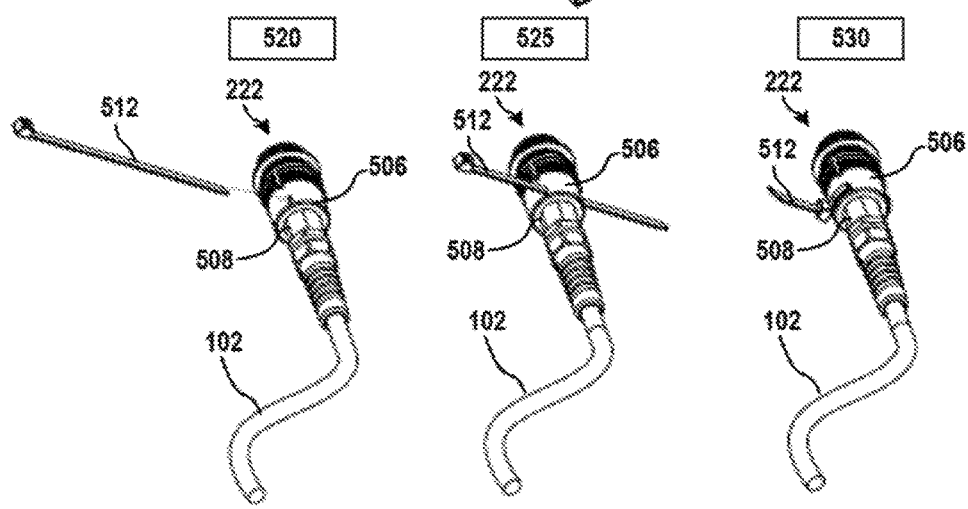

In an embodiment, the locking element 512 may include a cable tie. FIG. 5B depicts a method of locking a lockable connector 200 using a cable tie connector locking element 512. As shown in step 520 of FIG. 5B, the lockable connector 200 may be coupled to an adapter 220, for instance, through a bayonet-type connection. In step 525, the cable tie 512 may be inserted through openings 510a, 510b. The cable tie 512 may engage a portion of the locking element interface 504 (see FIG. 5D) arranged within the coupling nut 506 and prevent rotation of the coupling nut about the connector body 508. In step 530, the cable tie 512 may be tied off to prevent movement, removal, or the like of the cable tie from the lockable connector 200.

FIG. 5C depicts a side view of a lockable connector 200 coupled to an adapter 220 according and locked using a cable tie 512 according to some embodiments. FIG. 5D provides an internal front view of a portion of the lockable connector 200 coupled to the adapter 220 through the line A-A of FIG. 5C. As shown in FIG. 5D, the coupling nut 506 may include at least one connector body interface 514 arranged therein and configured to engage at least one locking element interface 504 of the connector body 508. The cable tie 512 may be inserted through openings 510a, 510b and engage another locking element interface 504. In this manner, the connector body interface 514 and the cable tie 512 may both engage at least one locking element interface 504 to prevent the coupling nut 506 from rotating and disconnecting from the adapter 520.

FIG. 6A depicts an illustrative lockable connector according to a C-clip embodiment. As shown in FIG. 6A, the lockable connector 200 may include a coupling nut 606 having at least one opening 610. A connector body 608 may be arranged within a longitudinal bore of the coupling nut 606 and may include at least one opening 616 corresponding to the coupling nut opening 610. In some embodiments, the coupling nut opening 610 and the connector body opening 616 may be configured as a slot, a recess, a hole, or a combination thereof. A C-clip 612 may be configured to be clipped around at least a portion of the coupling nut 606. The C-clip 612 may have at least one protrusion 614 formed on an inside surface of the C-clip and configured to correspond with the coupling nut opening 610 and the connector body opening 616.

The coupling nut 606 may be coupled to an adapter (not shown) as described according to some embodiments. The coupling nut 606 may be arranged such that the connector body opening 616 or at least a portion thereof is accessible through the coupling nut opening 610. As shown in FIGS. 6B and 6C, the C-clip 612 may be inserted (or "snapped") onto overlapping portions of the coupling nut 606 and the connector body 608 such that the protrusion 614 extends through the coupling nut opening 610 and down into the connector body opening 616. The connector body 608 may be threaded onto the compression fitting 220 such that the connector body does not rotate. The positioning of the protrusion 614 in the connector body opening 616 prevents the C-clip 612 from being able to rotate about the connector body 608. As the protrusion 614 also passes through the coupling nut opening 610, the protrusion also prevents the coupling nut 606 from rotating and disconnecting from the adapter.

Referring to FIG. 6C, some embodiments provide a lanyard connector 620 arranged on the C-clip 612. The lanyard connector 620 may be attached to a lanyard 618 or other connection element that is also connected to the communication cable 102. In this manner, the C-clip 612 may be maintained in proximity to the lockable connector 200 when unattached from the coupling nut 606 and connector body 608.

FIG. 6D depicts a front view of an illustrative C-clip 612 according to some embodiments. FIG. 6E depicts a front view of a lockable connector 200 having a C-clip 612 connected thereto and FIG. 6F depicts a cross-sectional view of the lockable connector through the line A-A of FIG. 6E. As shown in FIG. 6F, the protrusion 614 may be simultaneously locked into the connector body 608 and the coupling nut 606, thereby preventing the coupling nut from rotating about the connector body.

FIG. 6G depicts an illustrative lockable connection assembly according to a C-clip embodiment. As shown in FIG. 6G, a connection assembly 605 may include a lockable adapter 622 configured to connect with the coupling nut 606 of the lockable connector 600, for example, through a bayonet-type connector. The lockable adapter 622 may include at least one adapter slot 624 and the coupling nut 606 may include at least one corresponding connector slot 626. The connection assembly 605 may include at least one C-clip 612 having protrusions 614 that correspond with the at least one adapter slot 624 and the at least one connector slot 626.

FIG. 6H depicts an assembled lockable connector 600 coupled to an assembled lockable adapter 622. As shown in FIG. 6H, when the lockable connector 600 is coupled to the assembled lockable adapter 622, a gap 628 may be arranged therebetween. The gap 628 may be configured to provide sufficient space for the C-clip 612 to be clipped (or "snapped") between the lockable adapter 622 and the lockable connector 600 such that the protrusions 614 are positioned within the at least one adapter slot 624 and the at least one connector slot 626. The C-clip 612 may operate to engage the at least one adapter slot 624 and the at least one connector slot 626 to lock the coupling nut 606 to the lockable adapter 622, thereby preventing the unintentional de-coupling of the lockable adapter 622 and the lockable connector 600. FIG. 6I depicts the assembled lockable connector 600 coupled to an assembled lockable adapter 622 in which the lanyard 618 is connected to the lanyard connector 620 and to the communication cable 102.

Figure 7A:
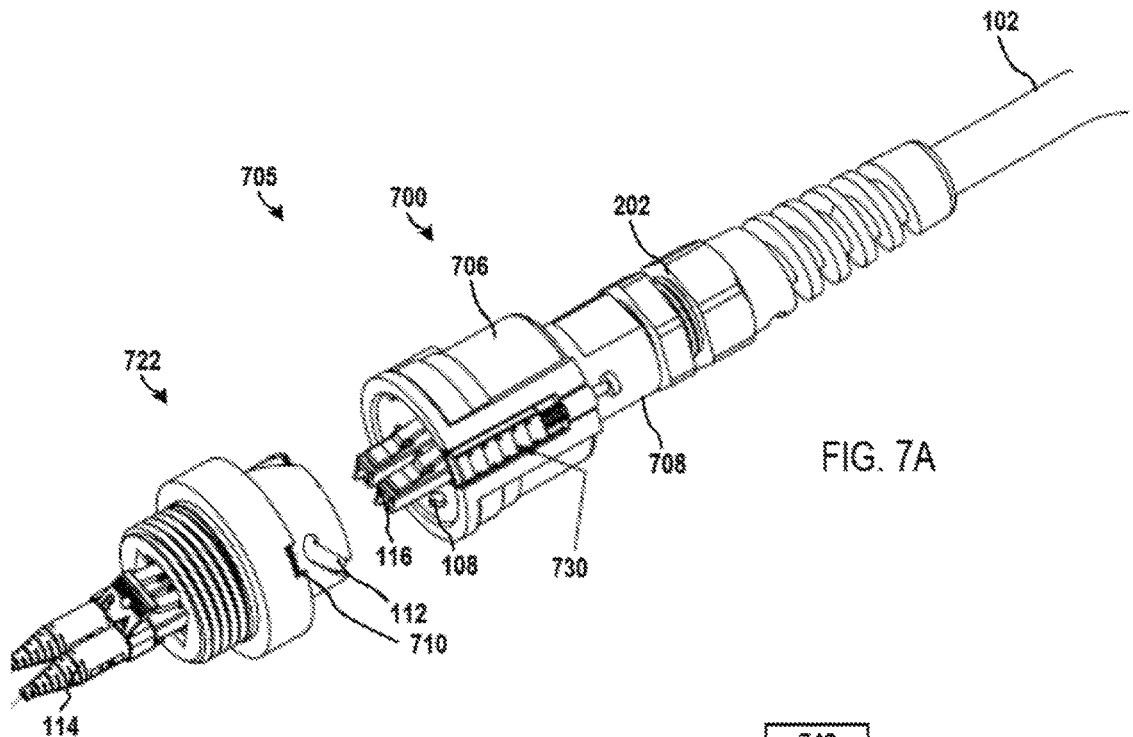
FIGS. 7A-G depicts an illustrative lockable connection assembly according to some key lock embodiments.
Figure 7B:
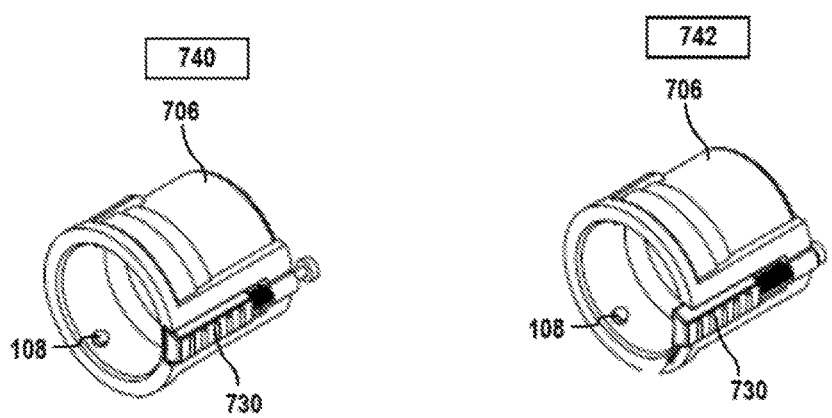

FIG. 7A depicts an illustrative lockable connection assembly according to a first key lock embodiment. As shown in FIG. 7A, a lockable connection assembly 705 may include a lockable connector 700 having a coupling nut 706 arranged about a connector body 708 and configured to connect with a lockable adapter 722 through a bayonet-type connection. The coupling nut 706 may include at least one key 730 configured to be extended to lock the lockable connection assembly 700 and to be retracted to unlock the lockable connection assembly 705 (see FIG. 7B). The at least one key 730 may be configured as a spring-loaded protrusion that may slide toward the lockable adapter 722. FIG. 7B depicts the coupling nut 706 with the spring-loaded key 730 in the retracted position 740 and the extended position 742.

Figure 7C:
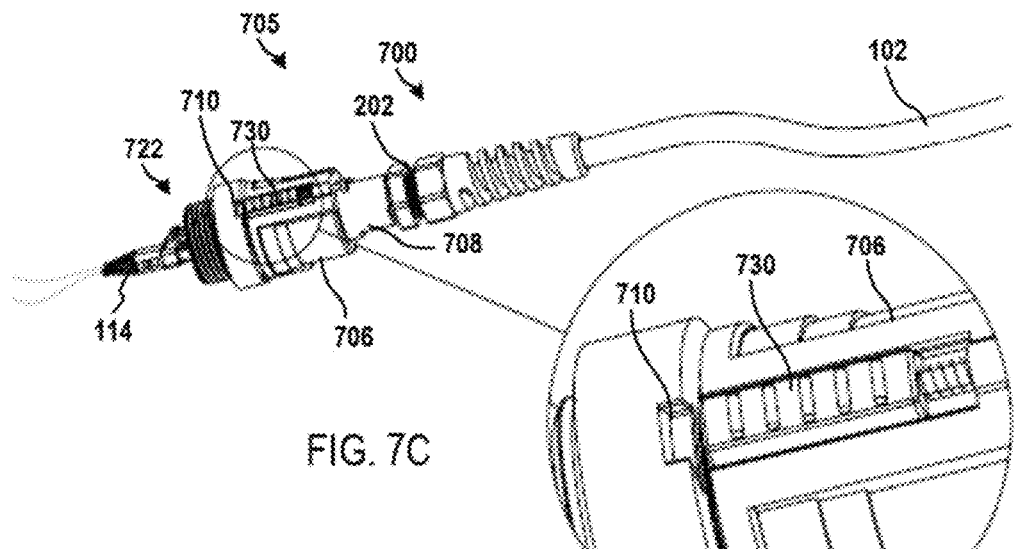
Figure 7D:
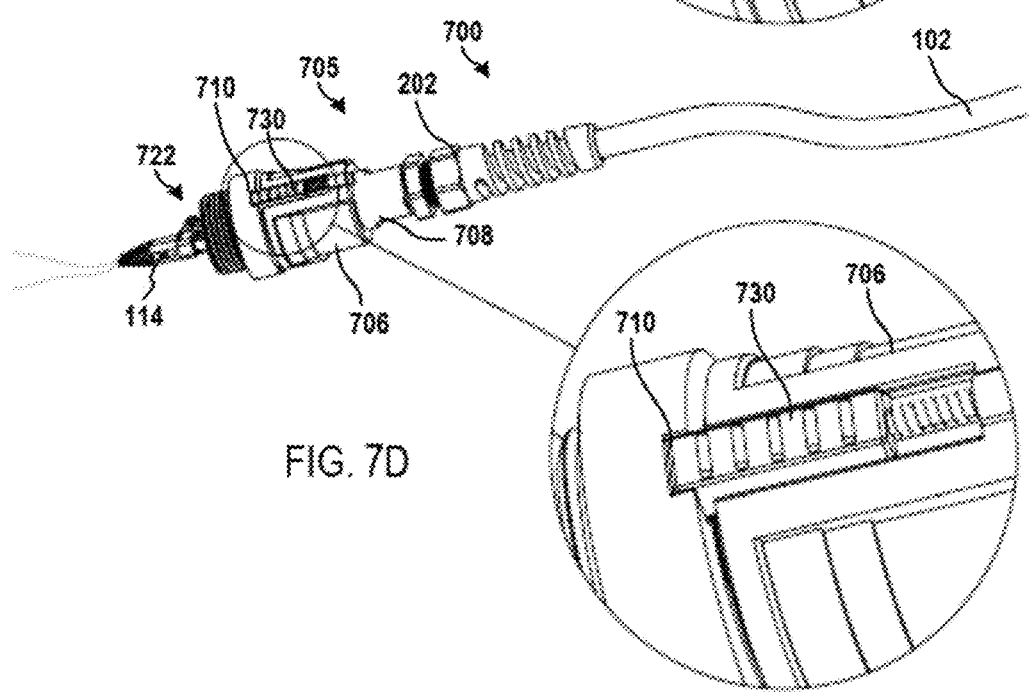

The lockable adapter 722 may include at least one slot 710 configured to receive the at least one extended spring-loaded key 730. When the lockable connector 700 is coupled to the lockable adapter 722, the spring-loaded key 730 may be extended and may engage the at least one slot 710. As the lockable adapter 722 is stationary (for instance, cannot rotate), the spring-loaded key 730 operates to prevent the coupling nut 706 from rotating and disconnecting the lockable connector 700 from the lockable adapter 722. FIG. 7C depicts the lockable connection assembly 700 with the spring-loaded key 730 in the retracted position and FIG. 7D depicts the lockable connection assembly with the key in the extended (or engaged) position. In FIG. 7C, the lockable connector 200 is coupled to the lockable adapter 722; however, the coupling nut 706 is free to rotate about the connector body 708. In FIG. 7C, the lockable connector 700 is coupled to the lockable adapter 722 and rotation of the coupling nut 706 is prevented because the spring-loaded key 730 is engaged with the slot 710.

Figure 7E:
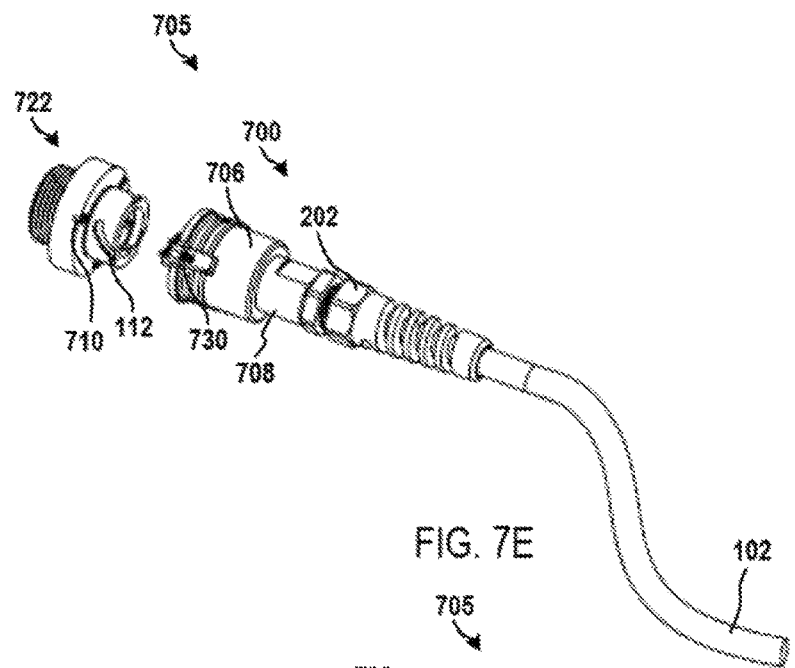
Figure 7F:
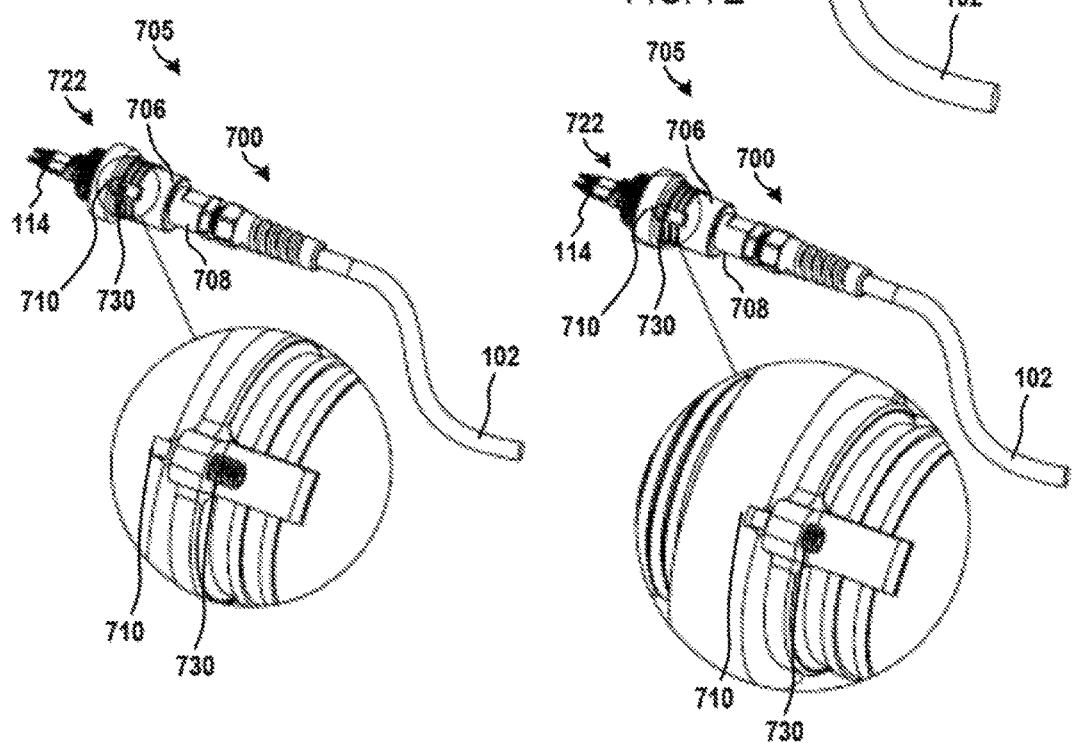
Figure 7G:
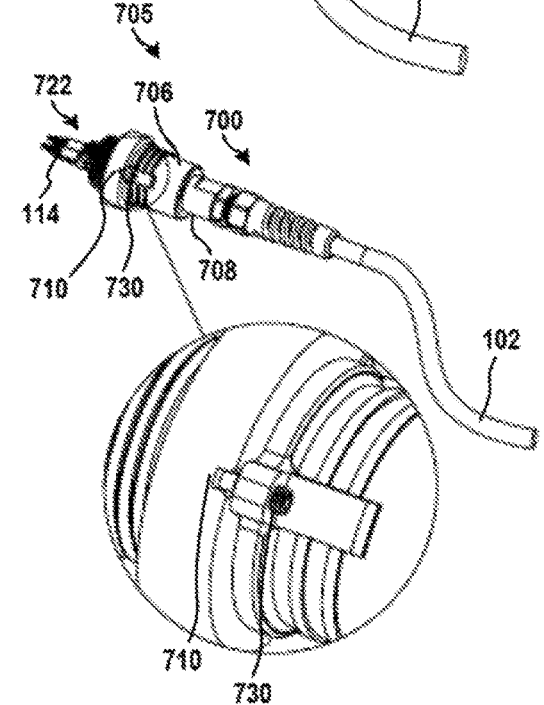

FIG. 7E depicts an illustrative lockable connection assembly according to a second key lock embodiment. As shown in FIG. 7E, the at least one key 730 may be configured as a screw-type key that may be rotated to extend the key into at least one slot 710 of the lockable adapter 722. When the lockable connector 700 is coupled to the lockable adapter 722, the screw-type key 730 may be extended and may engage the at least one slot 710. As the lockable adapter 722 is stationary (for instance, cannot rotate), the screw-type key 730 operates to prevent the coupling nut 706 from rotating and disconnecting the lockable connector 700 from the lockable adapter 722. FIG. 7F depicts the lockable connection assembly 705 with the key screw-type 730 in the retracted position and FIG. 7G depicts the lockable connection assembly 705 with the key in the extended (or engaged) position. In FIG. 7F, the lockable connector 700 is coupled to the lockable adapter 722; however, the coupling nut 706 is free to rotate about the connector body 708. In FIG. 7G, the lockable connector 700 is coupled to the lockable adapter 722 and rotation of the coupling nut 706 is prevented by the screw-type key 730 being engaged with the slot 710.

Although the key 730 is depicted as being a spring-loaded or screw-type key in FIGS. 7A-7G, lockable connection assemblies 705 are not so limited as any type of key may be used according to some embodiments described herein. For instance, the key 730 may be configured as a flange, pin, peg, or fastener capable of fixedly engaging the slot 710.

Figure 8A:
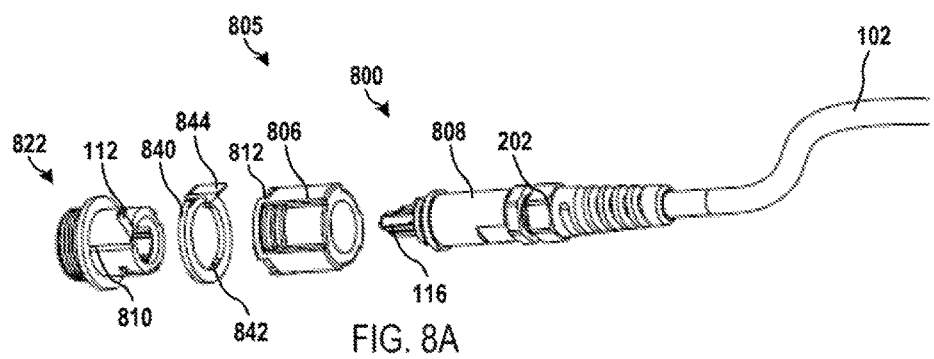
FIGS. 8A-C depict an illustrative lockable connection assembly according to a pawl lock embodiment.

FIG. 8A depicts an illustrative lockable connection assembly according to a pawl lock embodiment. As shown in FIG. 8A, a lockable connection assembly 805 may include a lockable adapter 822 configured to receive a pawl latch 840. The lockable adapter 822 may include at least one adapter slot (or groove) 810 corresponding to at least one protrusion 842 arranged on an internal surface of the pawl latch 840. The pawl latch 840 may be positioned around the lockable adapter 822 such that the at least one protrusion 842 engages the at least one adapter slot 810 to prevent the pawl latch 840 from rotating about the lockable adapter 822.

Figure 8B:
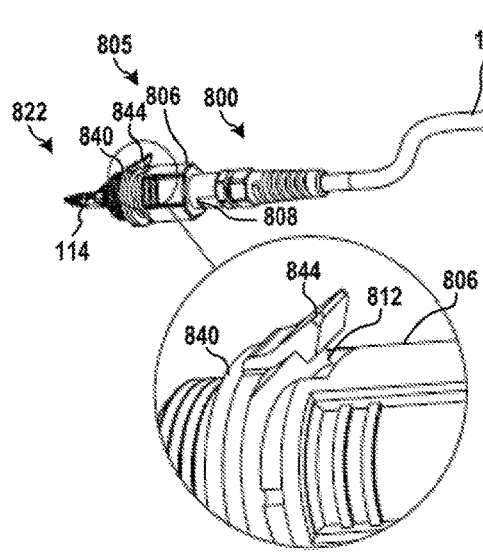

The lockable connection assembly 805 may include a lockable connector 800 having a coupling nut 806 arranged about a connector body 808 and configured to connect the lockable connector to the lockable adapter 822, for example, through a bayonet-style connection. The coupling nut 806 may include at least one coupling nut slot 812 corresponding to at least one tab or protrusion 844 (for instance, a flexible flange) extending from the pawl latch 840 and toward the lockable connector 800 when the lockable connector is coupled to the lockable adapter 822. As shown in FIG. 8B, the at least one tab 844 may be extended away from the coupling nut 806 in an unlocked position.

Figure 8C:
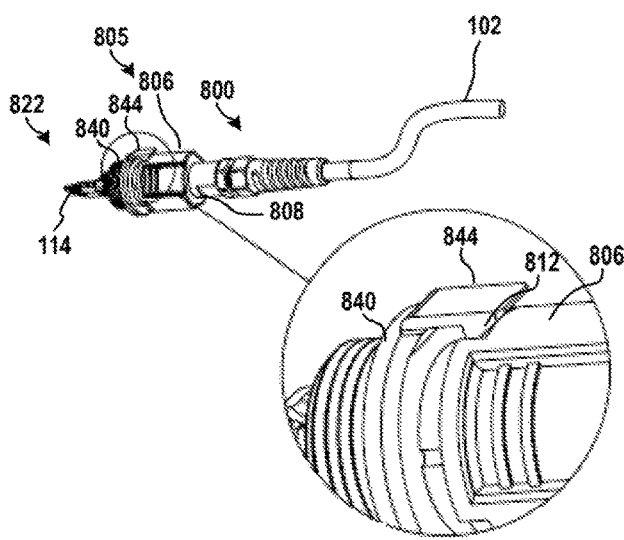

Referring to FIG. 8C, the at least one tab 844 may be released and may engage the coupling nut slot 812 to lock the lockable connector 800 to the lockable adapter 822. The at least one tab 844 may be configured to be biased toward the center of the pawl latch 840. As shown in FIGS. 8B and 8C, the coupling nut slot 812 may form an axial engagement surface 826 that may engage the at least one tab 844 responsive to the lockable connector 800 being pulled in a direction away from the lockable adapter 822. The coupling nut slot 812 may also form radial engagement surfaces 828 that may engage the at least one tab 844 responsive to an attempt to rotate the coupling nut 806, therefore preventing the coupling nut from rotating and disconnecting from the lockable adapter 822.

The locking of the connection components and connection assemblies according to some embodiments also operates to prevent the ingress of contaminants into the connection interface.

Although a fiber optic connector has been used as an illustrative embodiment, this detailed description is not so limited, as any type of electrical and/or communication connector may be used according to some embodiments. The connectors, adapters, and lockable components thereof may be used in combination with other connection elements and/or materials, such as crimpers, bands, straps, ferrules, locking materials, fluids, gels, or the like.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A lockable connection component comprising:
a coupling nut configured to rotatably couple the lockable connection component with a complementary mating component, the coupling nut having at least one slot;
a connector body configured to be non-rotatably attached to the lockable connection component and having at least one external recess, the connector body being arranged within a longitudinal bore of the coupling nut such that the at least one slot corresponds with the at least one external recess; and
a clip component having at least one protrusion, the clip component being configured to engage the coupling nut such that the at least one protrusion extends through the at least one slot and engages the at least one external recess, thereby preventing the coupling nut from rotating and disconnecting from the complementary mating component.

2. The lockable connection component of claim 1, wherein the lockable connection component is a fiber optic connection component.

3. The lockable connection component of claim 1, wherein the lockable connection component is an Open DeviceNet Vendors Association compliant connection component.

4. The lockable connection component of claim 1, wherein the lockable connection component is a lockable connector.

5. The lockable connection component of claim 1, wherein the lockable connection component is a lockable adapter.

6. The lockable connection component of claim 1, wherein the coupling nut connects the lockable connection component to the complementary mating component through a bayonet-type connection.

7. A lockable connection assembly comprising:
a first connection component having a coupling nut configured to rotatably couple the first connection component with a second connection component, the coupling nut having at least one first slot and the second connection component having at least one second slot, wherein a gap exists between the coupled first connection component and second connection component;

a clip component having at least one first protrusion and at least one second protrusion, the clip component being configured to be inserted within the gap such that the at least one first protrusion engages the at least one first slot and the at least one second protrusion engages the at least one second slot, thereby preventing the coupling nut from rotating and disconnecting from the second connection component.

8. The lockable connection assembly of claim 7, wherein the lockable connection assembly is a fiber optic connection assembly.

9. The lockable connection assembly of claim 7, wherein the lockable connection lockable connection assembly is an Open DeviceNet Vendors Association compliant connection lockable connection assembly.

10. The lockable connection assembly of claim 7, wherein the first connection component is a lockable connector.

11. The lockable connection assembly of claim 7, wherein the second connection component is a lockable adapter.

12. The lockable connection assembly of claim 7, wherein the coupling nut connects the first connection component to the second connection component through a bayonet-type connection.

* * * * *